July 8, 1958

S. A. SPERONI 2,841,938

AUTOMATIC CUP DISPENSING AND FILLING MACHINE
FOR FLUIDS AND SEMI-SOLIDS

Filed July 16, 1956

INVENTOR.
SILVIO A. SPERONI
BY
ATTORNEY

July 8, 1958

S. A. SPERONI 2,841,938

AUTOMATIC CUP DISPENSING AND FILLING MACHINE
FOR FLUIDS AND SEMI-SOLIDS

Filed July 16, 1956

INVENTOR.
SILVIO A. SPERONI
BY

ATTORNEY

INVENTOR.
SILVIO A. SPERONI
BY
ATTORNEY

July 8, 1958  S. A. SPERONI  2,841,938
AUTOMATIC CUP DISPENSING AND FILLING MACHINE
FOR FLUIDS AND SEMI-SOLIDS
Filed July 16, 1956  11 Sheets-Sheet 10

INVENTOR.
SILVIO A. SPERONI
BY
ATTORNEY

July 8, 1958 S. A. SPERONI 2,841,938
AUTOMATIC CUP DISPENSING AND FILLING MACHINE
FOR FLUIDS AND SEMI-SOLIDS
Filed July 16, 1956 11 Sheets-Sheet 11

INVENTOR.
SILVIO A. SPERONI
BY
ATTORNEY

United States Patent Office 2,841,938
Patented July 8, 1958

2,841,938

AUTOMATIC CUP DISPENSING AND FILLING MACHINE FOR FLUIDS AND SEMI-SOLIDS

Silvio A. Speroni, Bayside, N. Y.

Application July 16, 1956, Serial No. 597,917

13 Claims. (Cl. 53—282)

This invention relates generally to continuous motion packaging machines and, more particularly, to an automatic packaging machine for fluid, viscous and semi-solid products, and the like.

A primary object of the invention is to provide a machine of this kind with improved means for feeding the cups and containers of various sizes.

Another object of the invention is to provide a machine of this kind with improved means for filling the cups with fluids such as milk, fruit juices, ice cream, ketchup, mayonnaise and the like.

A further object of the invention is to provide a machine of this kind with improved means for capping the filled cups and containers.

It is also an object to provide a machine of this kind with improved means for camming the filled cups and containers on to a collecting platform.

It is also proposed to produce an automatic fluid packaging machine that is positive and highly efficient in operation, rugged in construction and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
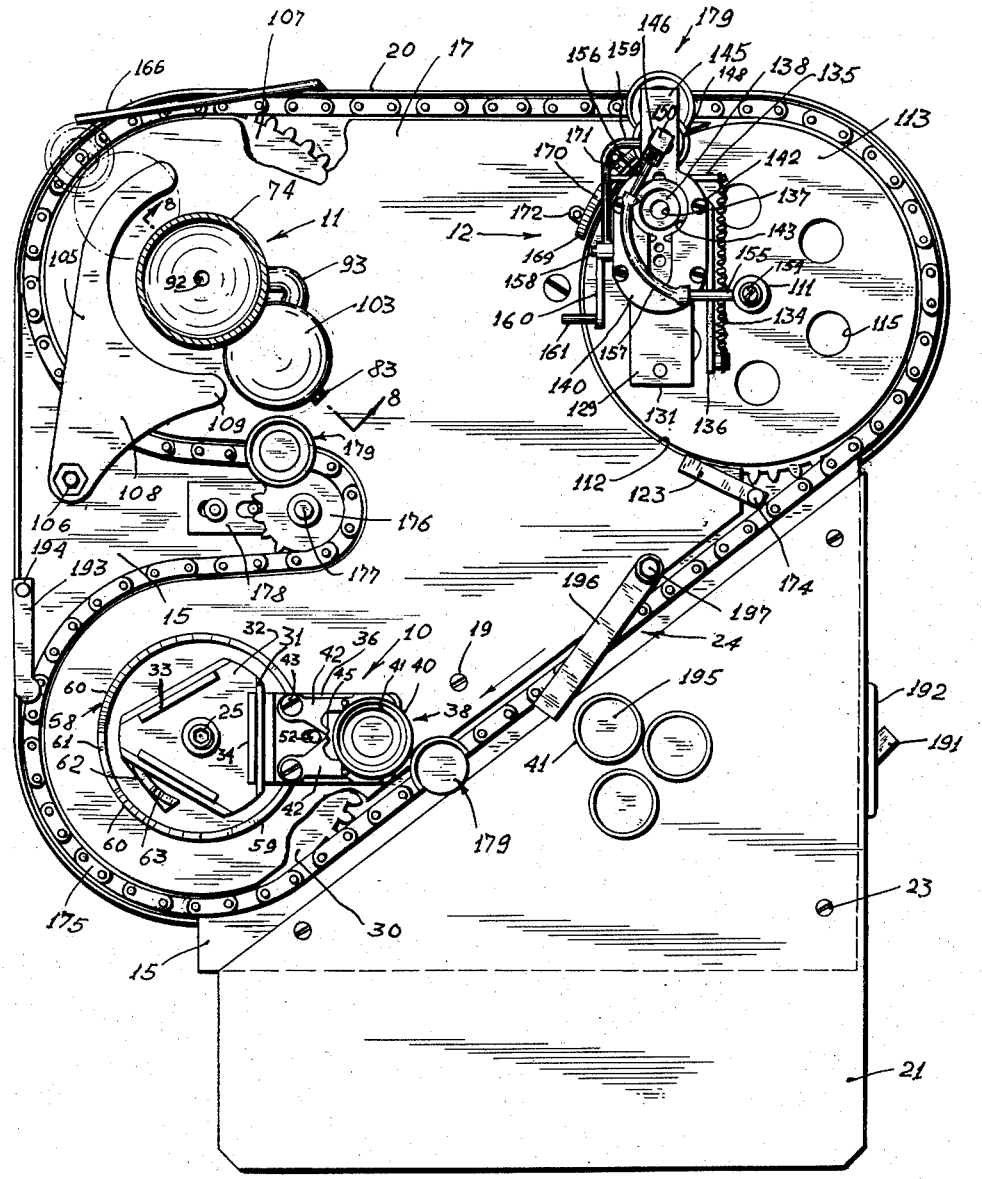
Fig. 1 is a top plan view of a machine embodying the invention.

Referring to the drawings in detail, a machine made in accordance with the invention is shown in Fig. 1 as comprising broadly mechanism for feeding cups and containers indicated generally at 10, mechanism for filling the cups with fluid and viscous products indicated generally at 11, and mechanism for caping the filled cups as indicated generally at 12. The various mechanisms are supported on a frame comprising a substantially square-shaped base plate 15 of heavy metal stock supported on metal legs 16. A top or cover plate 17 of substantially triangular shape, of lighter metal stock, is spaced above the base and is supported on top of vertical blocks 18 secured to the base. Screws 19 fasten the cover plate to the blocks.

A wide band or strip 20 of sheet metal closes two adjacent sides of the machine between the base and cover plate and extends around and along a third side for a portion of its length. The machine is open between the base and cover plates for the remainder of its side portions. The cover plate 17 covers the major area of the base and the remainder of the base is covered by a plate 21 of the same material as plate 17 and is disposed in the same plane therewith. Plate 21 is supported on vertical posts 22 on the base and is secured thereto by screws 23. The plate 21 is closely spaced from the cover plate 17 leaving a clearance as indicated at 24, and extends beyond the frame constituting a collecting platform.

Figure 5:
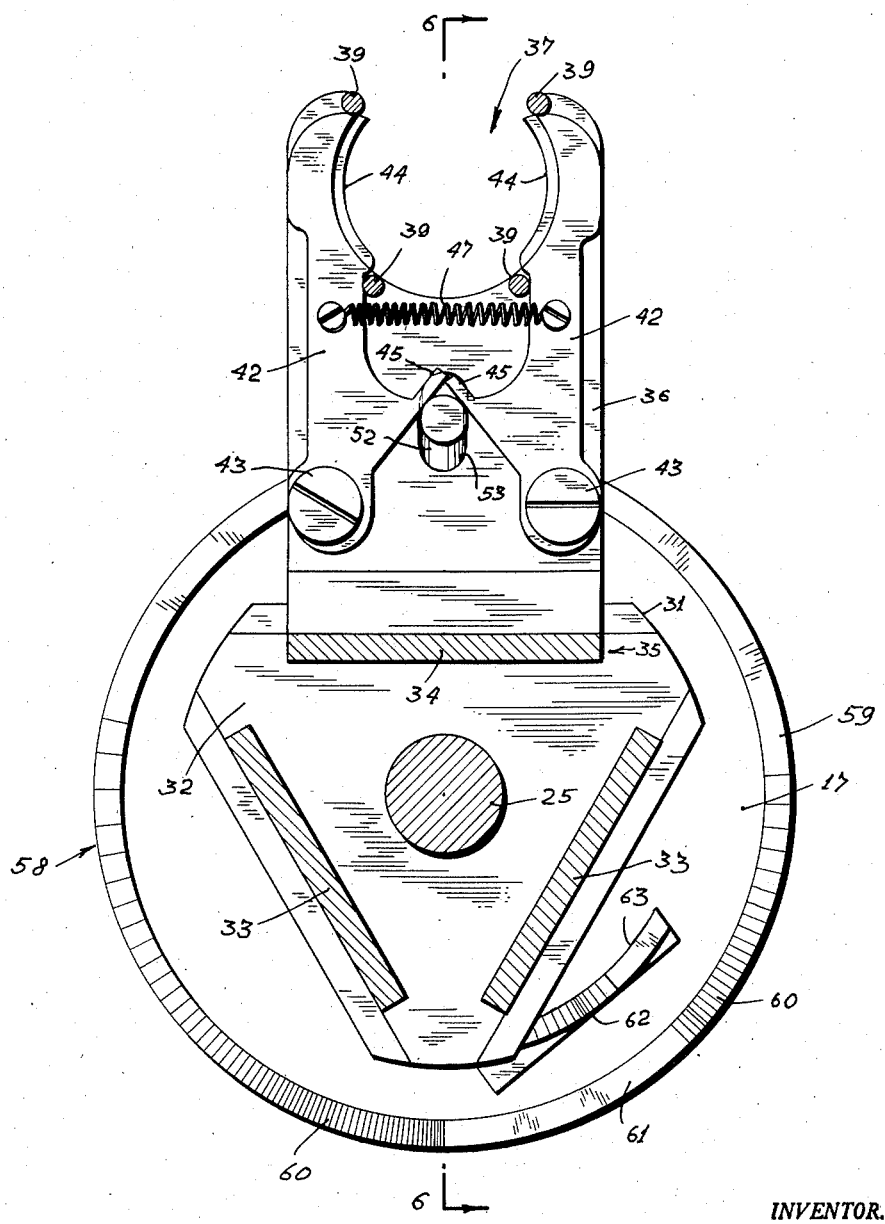
Fig. 5 is an enlarged horizontal sectional view taken on the plane of the line 5—5 of Fig. 2.
Figure 6:
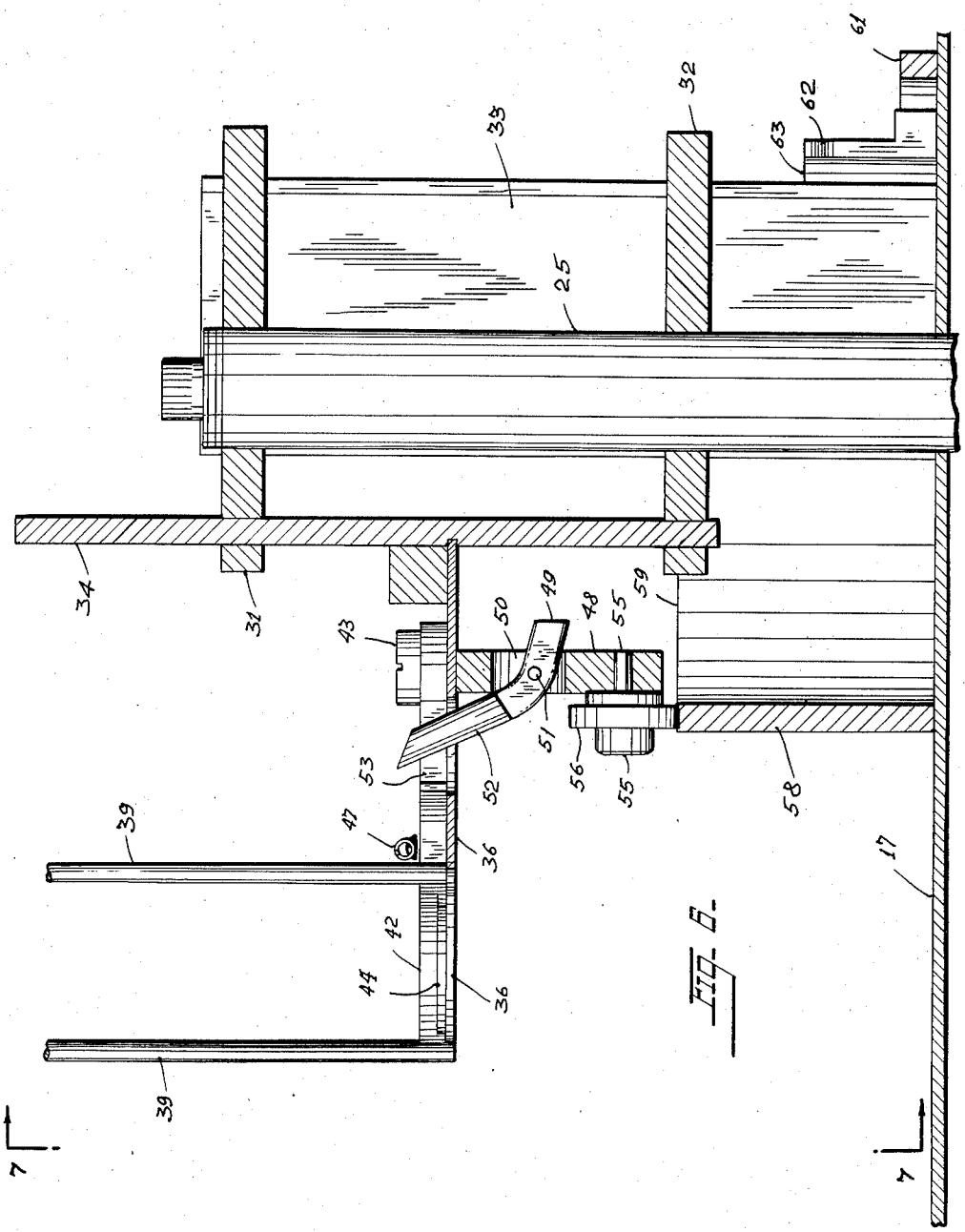
Fig. 6 is a vertical sectional view taken on the plane of the line 6—6 of Fig. 5.
Figure 7:
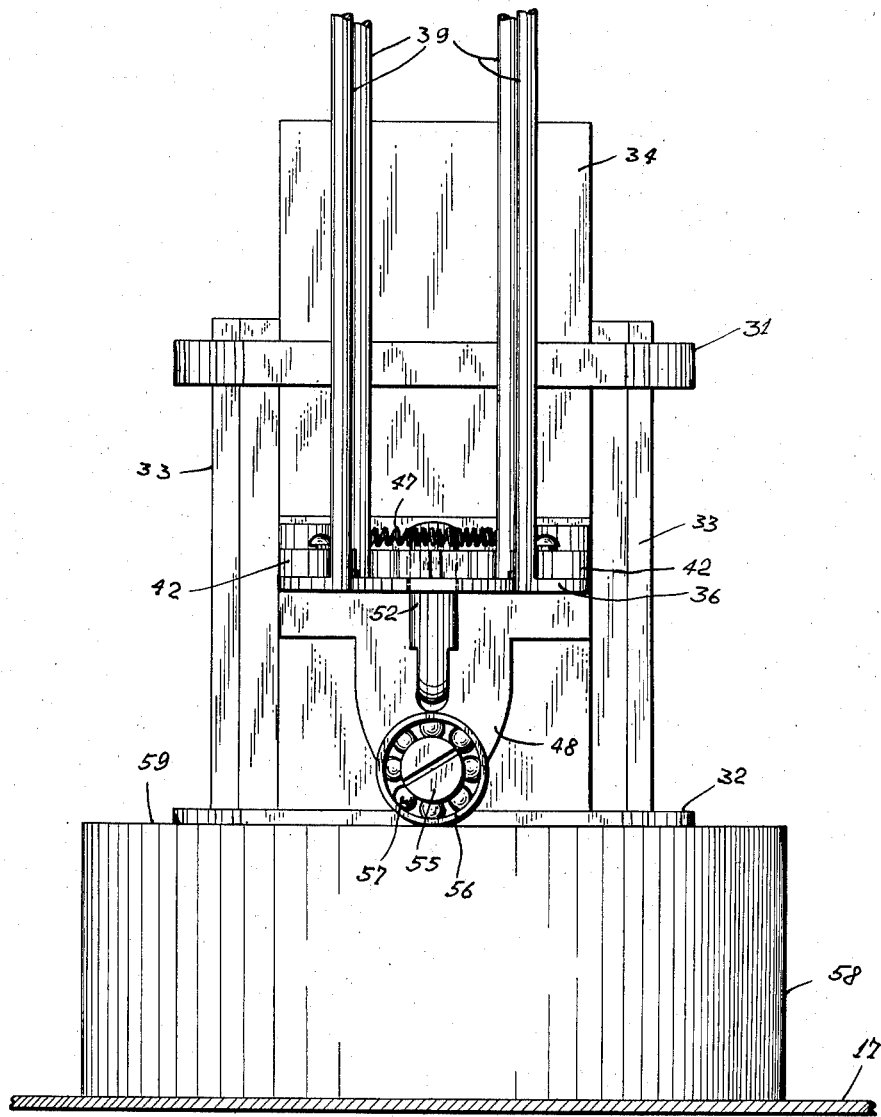
Fig. 7 is a vertical sectional view taken on the plane of the line 7—7 of Fig. 6 and looking in the direction of the arrows.

The cup feeding mechanism 10, as best shown in Figs. 5, 6 and 7, includes a vertically disposed driven shaft 25 journalled in the base plate 15 and cover plate 17 and extending below the base plate and above the cover plate. The drive is brought to the shaft 25 from a motor 26, secured to the base plate 15, by means of a belt 27 trained around a pulley 28 on the motor shaft, and a pulley 29 fixed on the bottom end of shaft 25.

A sprocket wheel 30 is secured to the drive shaft 25 below and adjacent the cover plate 17 for a purpose to be later explained.

Two triangular shaped horizontally disposed plates, an upper plate 31 and a lower plate 32 are fastened to shaft 25 above the cover plate 17. The upper plate 31 is disposed close to the top of the shaft and the lower plate 32 is spaced downwardly therealong. The plates 31 and 32 are fast to the shaft with the lower plate 32 being spaced above the cover plate 17. Two vertically disposed plates 33, 33 are secured to two adjacent side edges of the triangular plates, the lower ends of the vertical plates being spaced from the cover plate 17.

A vertically disposed plate 34 is slidably mounted in slots 35 formed adjacent the other side edges of the horizontal triangular shaped plates 31 and 32. A horizontally disposed supporting plate 36 has one end fastened in a transverse groove in the slidable plate 34 midway the height thereof. The other end of the horizontal supporting plate 36 is bifurcated, forming a substantially semicircular cup-receiving opening 37.

Figure 2:
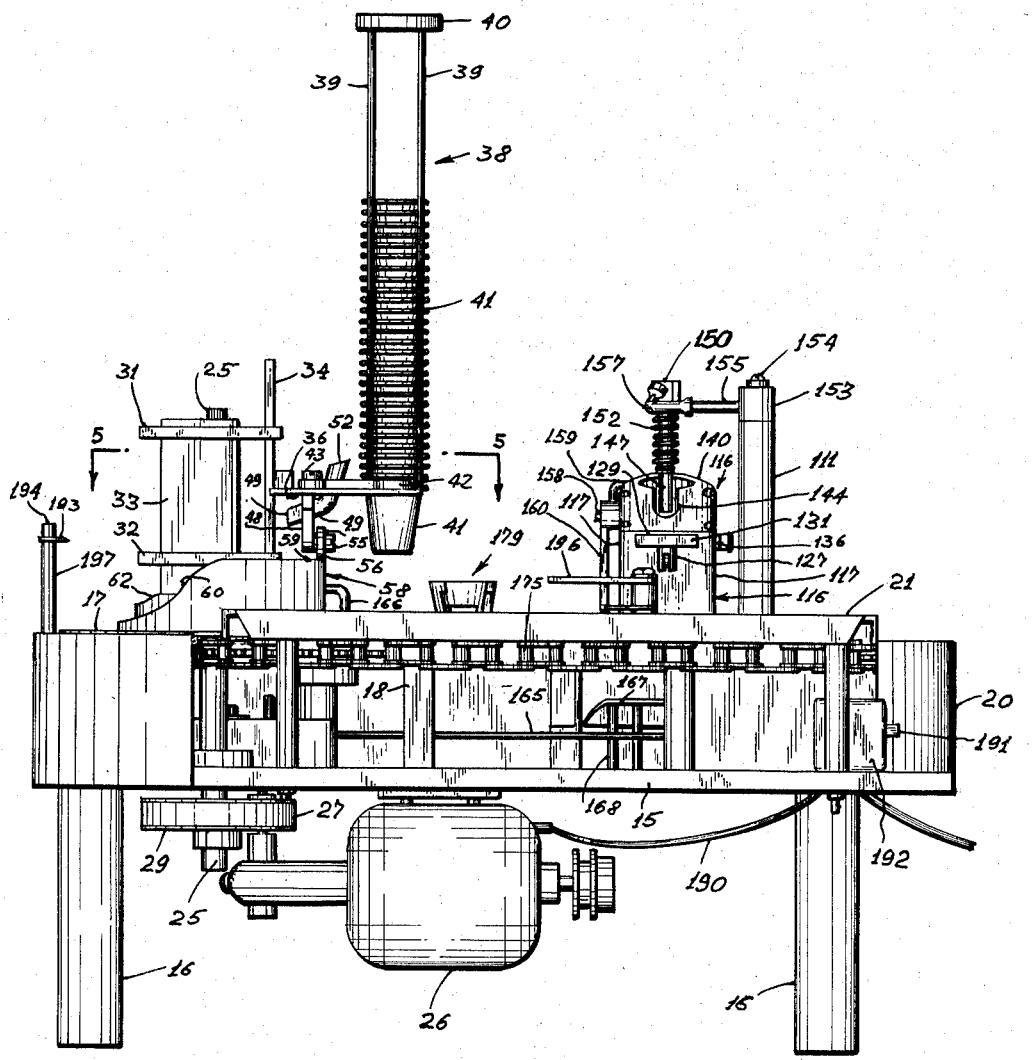
Fig. 2 is a side elevational view thereof showing cups supported in stacked formation.
Figure 3:
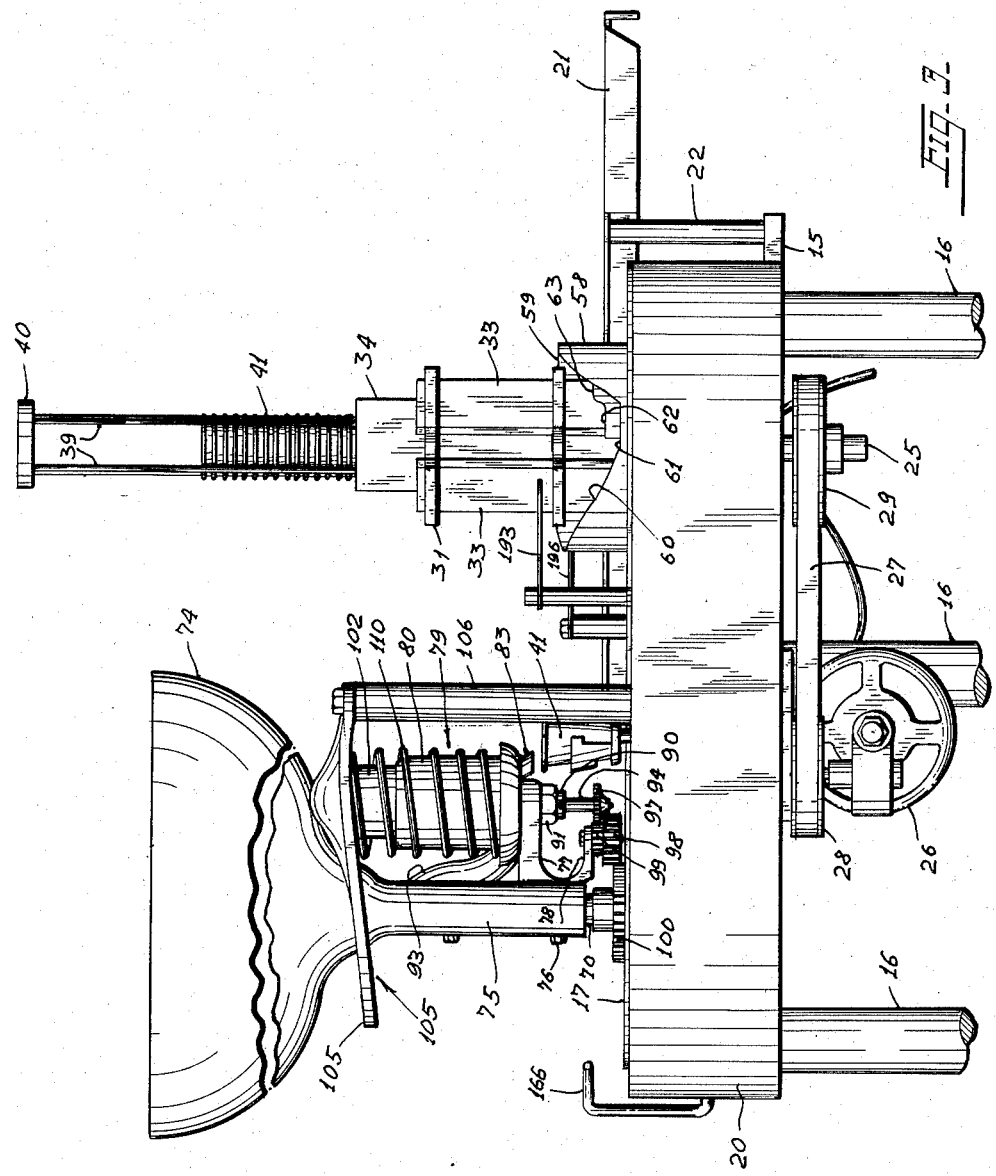
Fig. 3 is a similar view looking from the left of Fig. 2.

A cup magazine or support 38 is mounted on the outer end of the supporting plate 36. This magazine comprises four upstanding spaced rods 39, arranged in square configuration in plan, and secured to their lower ends to the supporting plate 36 and connected at their top ends by a ring 40. The rods are adapted to guide the downward movement of a supply of cups 41 positioned therebetween in stacked relation as best shown in Fig. 2, in line with the opening 37 in the supporting plate 36.

Two opposed clamping and supporting arms 42, 42 are pivotally mounted on the upper surface of the supporting plate 36. One end of each arm is pivotally secured to an upstanding pivot bolt 43 fastened to the supporting plate. The other end of each arm is formed with an arcuate shaped inner surface 44 shaped to conform to the shape of the sides of the opening 37 in the plate 36. Intermediate its ends, each arm is formed with an inwardly angularly projecting extension 45. The arcuate shaped surfaces 44 of the arms are in opposed relation and their edges extend inwardly of the edges of the bifurcated portions of the supporting plate 36 so as to engage the beaded flange 46 on the mouth end of a cup 41 and hold the stack of cups against downward movement.

The opposed projecting extensions 45 are in opposed relation, the extensions being adapted to engage each other and are normally held in engagement by a coil spring 47 extending across the space between the arms 42, 42, and connecting said arms outwardly of the extensions 45 and normally yieldingly drawing the arms toward each other.

A bracket 48 (Fig. 6) is secured to the under surface of the horizontal supporting plate 36 and depends therebelow. The bracket affords a bearing for an angular rod constituting a bell crank lever which has its substantially horizontally disposed arm 49 extending through an elongated slot 50 in the center of the bracket 48 and is pivotally secured to a pivot pin 51 extending across said slot. The other arm 52 extends substantially upwardly through and above an elongated slot 53 in the supporting plate 36. The upper end of the arm 52 is disposed in alignment with the meeting ends of the extensions 45 on the clamping arms 42, 42 so that upon tilting of said bell crank lever, said end of the lever will be moved between said extensions and move the clamping arms 42, 42 away from each other thereby releasing the grip on the lowermost cup in the supported stack of cups and permitting said cup to fall by gravity through the opening 37 in the supporting plate 36, said opening being slightly larger in diameter than the diameter of the mouth end of the cup.

A stub shaft 55 is supported at the bottom end of the bracket 48 and projects laterally therefrom and mounted on the outer end of shaft 55 is a roller 56 rollable on ball bearings 57. A tubular structure 58 is secured to the cover plate 17 around the shaft 25. The upper end of the tubular structure has a straight upper surface 59 merging into downwardly slanting surfaces 60, the latter merging into a lower straight surface 61, said surfaces constituting a camming track disposed in the path of movement of the roller 56.

An arcuately shaped vertically disposed plate 62 is mounted on the cover plate 17 just inside the tubular structure 58 and is formed with a straight extension 63 at its top end. This extension is in the path of movement of the horizontal arm 49 of the bell crank lever so that when the slidable plate 34 is carried downwardly, said arm 49 of the bell crank lever will strike the extension 63 of plate 62 and tilt the bell crank lever in a clockwise direction as viewed in Fig. 2, swinging the nose portion of the substantially vertically disposed arm 52 into engagement with the meeting edges of the extensions 45 on the clamping arms 42, 42, thereby pushing said arms apart to release the gripped cup 41 held therebetween, permitting it to drop through the opening 37 in supporting plate 36. When the arm 49 of the bell crank rides off the end of the straight extension 63, the coil spring 47 comes into action and retracts the arms 42, 42 to cup-gripping position again.

Figure 8:
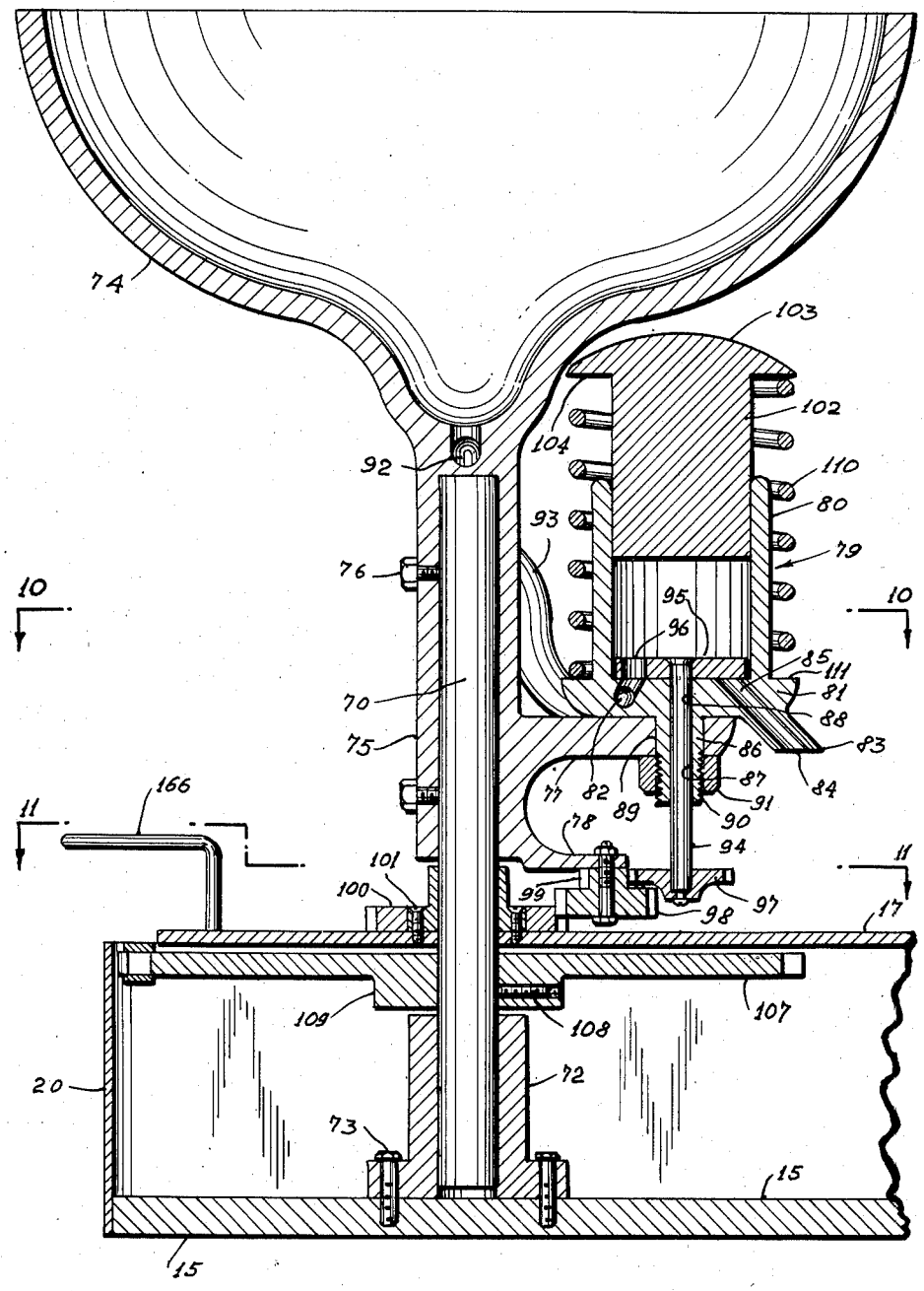
Fig. 8 is an enlarged vertical sectional view taken on the plane of the line 8—8 of Fig. 1.
Figure 9:
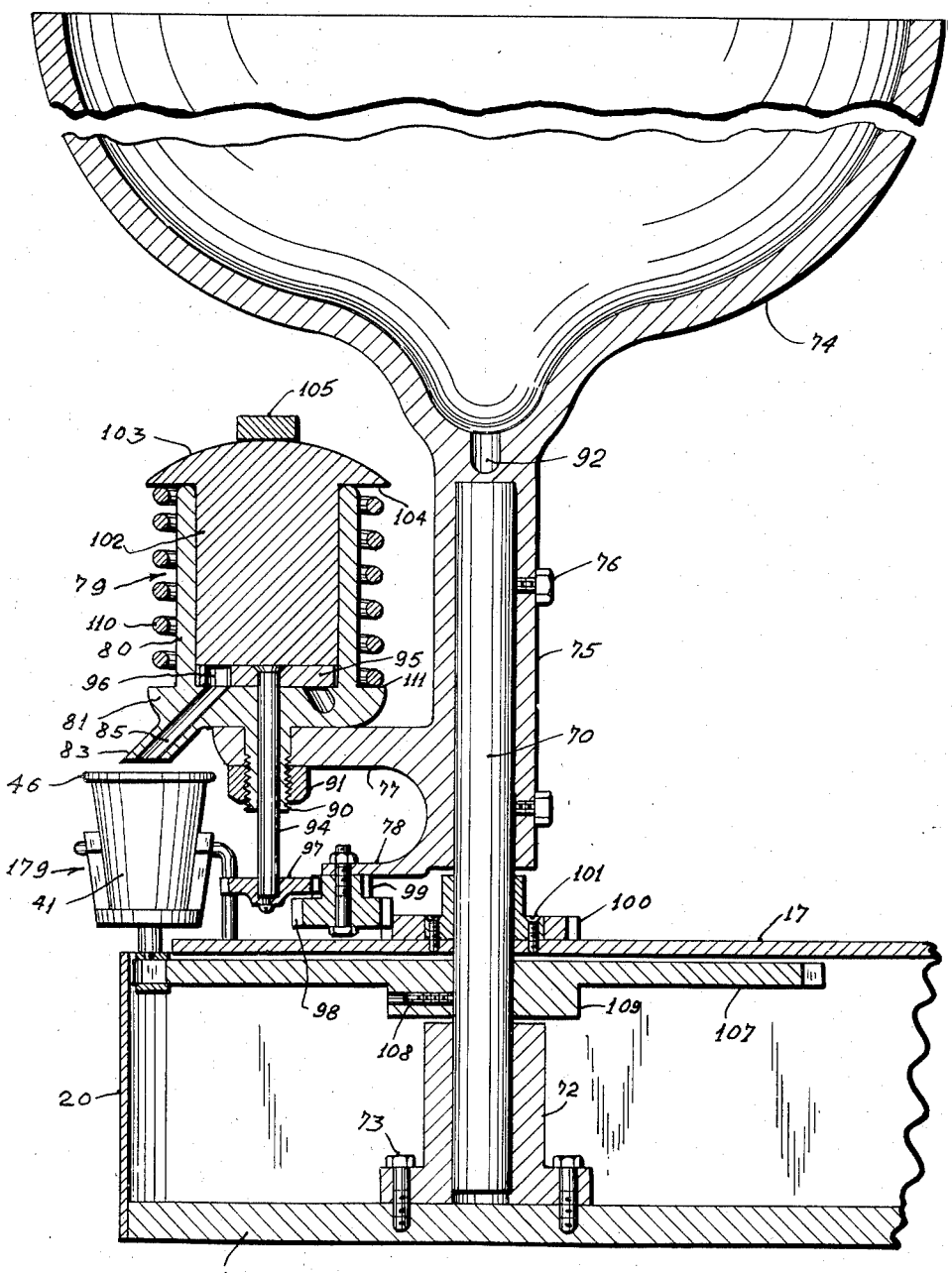
Fig. 9 is a similar view taken on the plane of the line 9—9 of Fig. 1.
Figure 10:
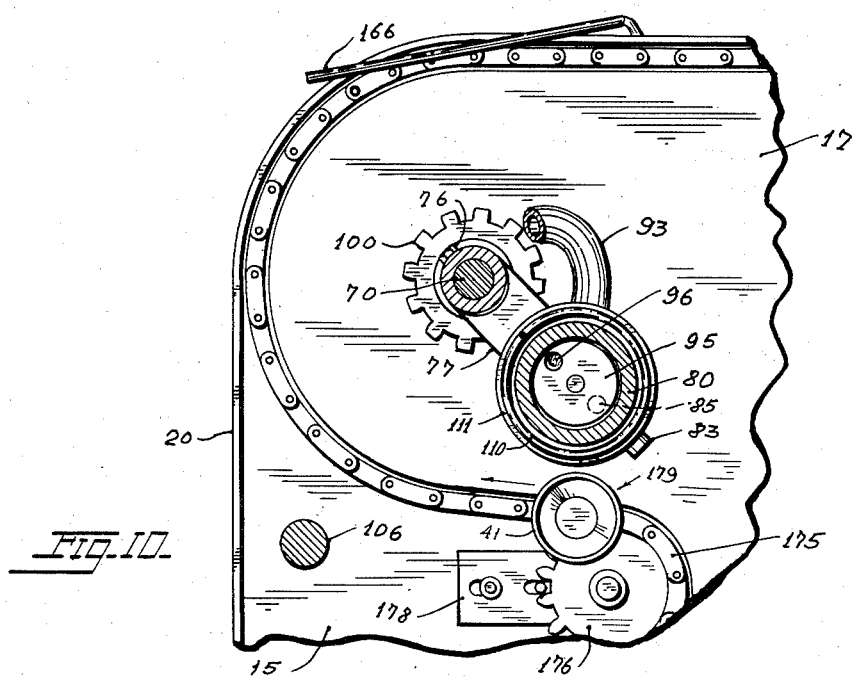
Fig. 10 is a horizontal sectional view taken on the plane of the line 10—10 of Fig. 8.
Figure 11:
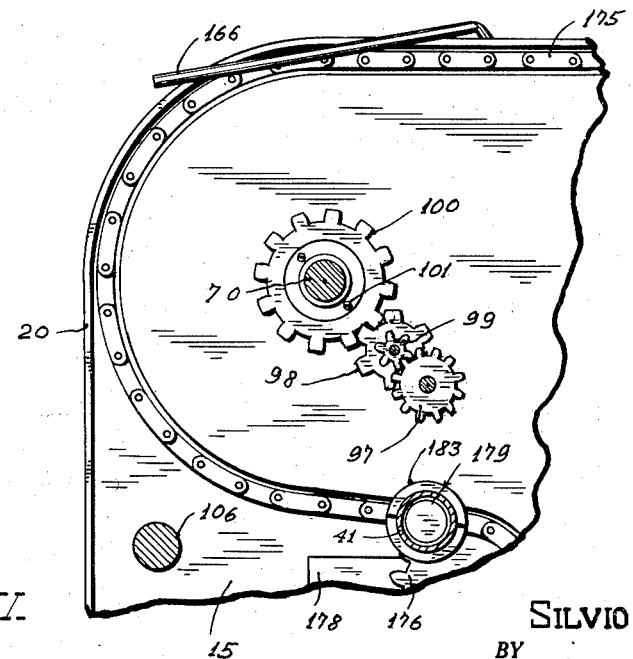
Fig. 11 is a similar view taken on the plane of the line 11—11 of Fig. 8.
Figure 12:
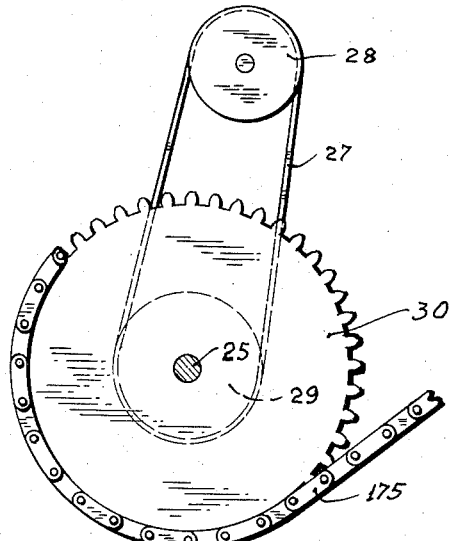
Fig. 12 is a detail view showing the drive for the chain.
Figure 13:
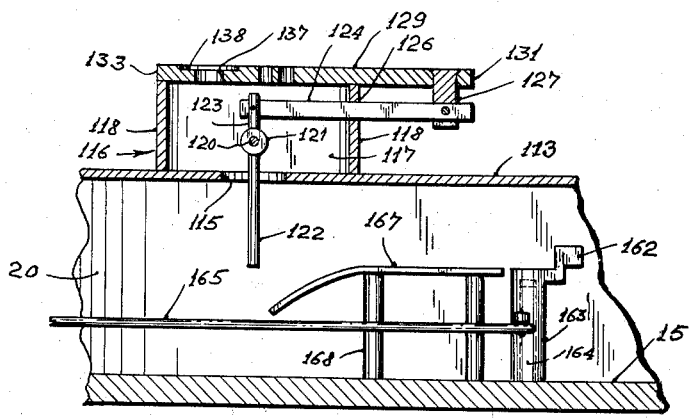
Fig. 13 is a sectional detail view showing the tripper for the capping mechanism.

The mechanism for filling the cups or containers 41 with a measured quantity of fluid and viscous products, is also mounted above the cover plate 17 of the machine and is best shown in Figs. 8 and 9. This mechanism includes a driven shaft 70 extending upwardly through an opening 71 in the cover plate 17 and journalled at its bottom end in a tubular bearing block 72 secured to the base plate 15 of the machine by screws 73. A hopper 74 is mounted on the upwardly projecting portion of the shaft 70 by means of a socketed stem 75 fitted over the shaft and secured thereto by screws 76. At its lower end, the stem 75 is formed with a U-shaped lateral extension having an upper arm portion 77 and a lower arm portion 78. A cylindrical container, indicated generally at 79, for holding a measured quantity of ice cream, is removably mounted on the upper arm portion 77. This container is cup-shaped having a side wall 80 and a bottom or base wall 81 of thicker dimension than the side wall. The bottom or base wall is formed adjacent its periphery with an inlet opening 82 and with an outlet spout 83 having a slanting passage 84 therethrough communicating with a similar passage 85 in the base wall, the latter passage communicating with the interior of the container. A central stem 86 depends from the base wall of the container and is formed with a central bore 87 forming an extension of a central bore 88 in the base wall, the latter bore communicating with the interior of the container. The central stem 86 extends through an opening 89 in the upper arm portion 77 of the stem of the hopper and projects therebelow and is provided with external threads 90 to receive a nut 91 for securing the container to the arm portion 77.

At its junction with the stem 75, the hopper is formed with an outlet opening 92 and this opening is connected to the inlet opening 82 in the base wall 81 of the container 79 by means of a pipe 93. A shaft 94 extends through the bores in the stem and base wall of the container and projects into the interior of the container. A disc 95 is secured to the inner end of the shaft and is provided with an opening 96 along its periphery adapted to register selectively with either the inlet 82 or the outlet 85 in the base wall 81. The outer end of shaft 94 mounts a spur gear 97. Another spur gear 98 is bolted to the lower arm portion 78 and depends therefrom. A pinion 99 is fastened to the hub portion of gear 98 and is in mesh with the spur gear 97 on shaft 94. Gear 98 is in mesh with a gear 100 fastened to the cover plate 17 by screws 101, which gear is disposed loosely around the shaft 70. The gears 97, 99 and 100 have a two-to-one ratio.

A piston 102 is slidable in the container 79 for ejecting the ice cream through the opening 96 in the disc 95 and through the registering passages 85 and 84 in the base wall and spout, respectively, outwardly of the spout. The piston is formed with a curved head portion 103 protruding slightly outwardly of the body of the piston thereby forming an annular shoulder 104. An elongated camming arm 105 (Fig. 1) is supported on the top end of a post 106 fixed on the base plate 15 and extending upwardly through a deep slot in the cover plate 17. The post extends above the top of the container 79 and the camming arm 105 is disposed substantially horizontally. The camming arm 105 is formed with an enlarged portion 108 terminating in a laterally extending finger portion 109. The camming arm gradually slants downwardly from the outer tip of the finger portion 109 to the free end of the body portion of the arm. The camming arm, including its enlarged portion and finger portion is disposed in the path of movement of the container 79 when it is carried around by the shaft 70 so that the curved head portion 103 of the piston is initially engaged by the finger portion 109 and then by the enlarged portion 108 and finally by the elongated body portion of the camming arm 105 so that the piston is gradually forced downwardly through the container 79 from the position of Fig. 8 to the bottom thereof, to the position shown in Fig. 9 thereby forcing the contents of the container out through the spout 83. A compression spring 110 encircles the container 79 with one end seated on an annular shoulder 111 formed on the base wall 81 of the container and with its other end impinging against the shoulder 104 on the head portion 103 of the piston 102. When the container rides free of the camming arm 105, the spring forces the piston upwardly to the position of Fig. 8 again ready for another cycle of operation.

A sprocket wheel 107 is secured to the shaft 70 below and adjacent to the clover plate 17 by means of a screw 108 passing through the hub portion 109 thereof.

Figure 4:
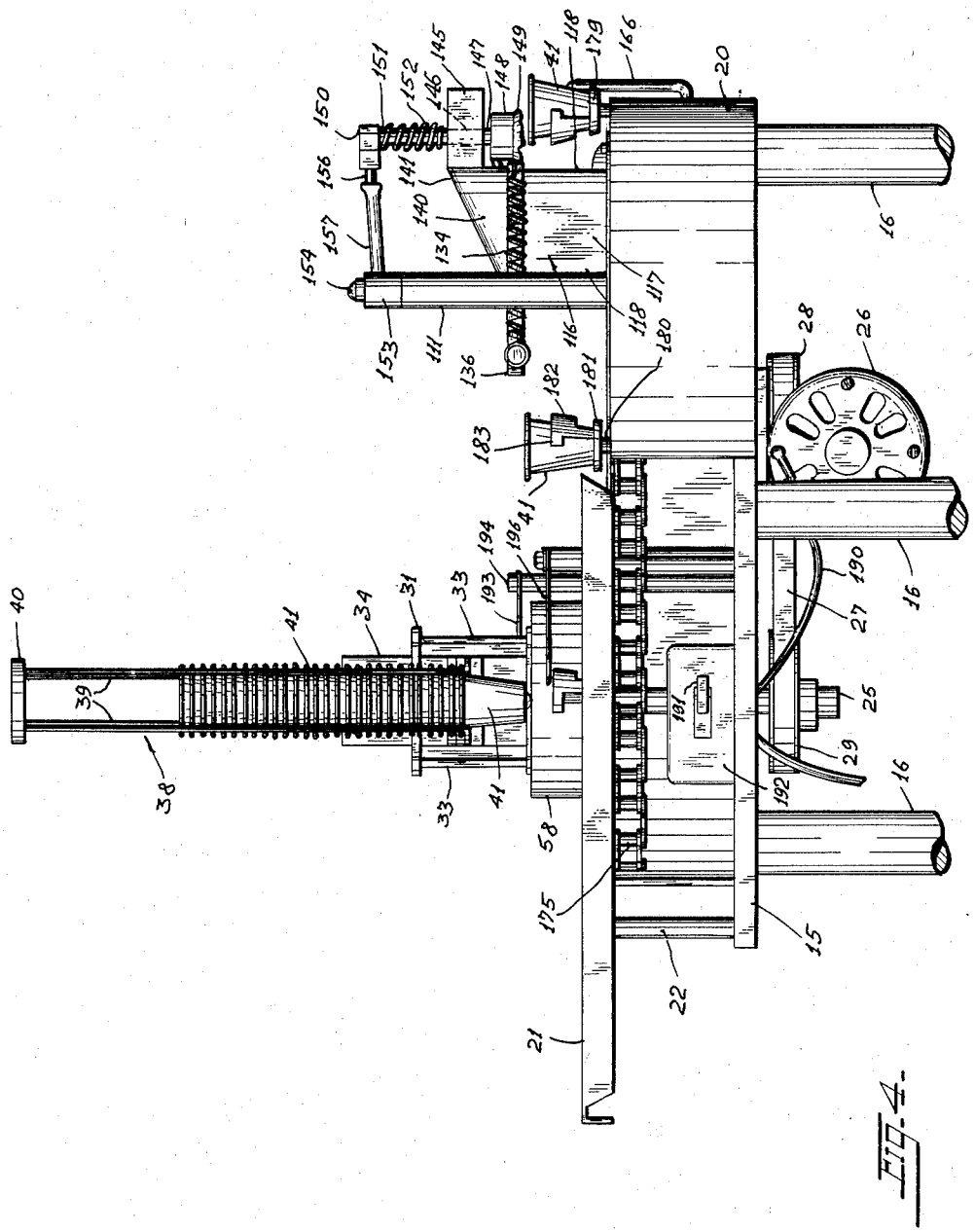
Fig. 4 is a similar view looking from the right of Fig. 2.

The mechanism for capping the filled cups or containers 41 is best shown in Figs. 1, 2 and 4. This mechanism includes a vertical immovable tubular shaft 111 fixed on the base plate 15, projecting through and above a semicircular cutout portion 112 in the cover plate 17 at its apex end. The tubular shaft at its bottom end is connected to a suitable source of air supply such as a pump (not shown). Rotatably mounted on shaft 110 is a toothed disk 113. The disk 113 is positioned in the cutaway portion of the cover plate, in the same plane as the cover plate, and may be formed with a series of openings 115 to reduce its weight. The disk constitutes a turntable. A casing or housing 116 is bolted to the disk 113. The housing is rectangular in cross section having side walls 117 and end walls 118. A shaft 120 is rotatably supported on and between the inner surfaces of the side walls 117 and a collar 121 is fastened to the shaft midway its ends. A finger 122 depends from the collar downwardly below the disk 113 and cover plate 17. A stud 123 extends upwardly from the collar in opposed relation to the finger 122. The top end of the stud is slotted to receive one end of a lever bar 124, which extends through a slot 126 formed in one end wall 118 of the housing to the exterior thereof. The outer end of lever bar 124 is pivotally secured to a stud 127 depending from one end 129 of a plate 131 slidably mounted over and along the top surfaces of shoulders of cutout portions on the top of the side walls 117. The attached end 129 of the plate 131 normally extends outwardly of the adjacent end 118 of the housing. The other end 133 of the plate 131 is normally substantially flush with the other end wall 118 of the housing.

A pressure spring 134 having one end secured to a lug 135 projecting laterally from the end 133 of the sliding plate 131 and having its other end secured to the end of an elongated bar 136 secured to one of the side walls 117 of the housing and projecting therebeyond to the attached end 129 of the plate 131 normally forces and holds the sliding plate 131 with its end 129 projecting beyond the housing, as shown in Fig. 1, and thereby holding the depending finger 122 in a vertical position. Plate 131 is formed with a central opening 137 at its end 133 and with a countersunk portion 138 therearound on its upper surface.

A bearing block 140 is mounted on the top of the housing 116 and is substantially rectangular in cross section, forming an extension of the housing 116. The top surface 141 of the block slants downwardly from one end surface to the bottom surface. The block is secured to the housing by screws 142 passing through registered openings in the sides of the block and in the top of the side walls of the housing 116. Plate 131 slides underneath the block 140. The block is formed with a central circular recess 143 and with an elongated slot 144 extending along the long axis of the block and intersecting the central recess. The recess is adapted to house a supply of caps for the cups 41 in stacked formation, with the lowermost cap of the stack seated on countersunk portion 138 of the slidable plate 131. An extension or nose portion 145 is integrally formed on the block at its top end and projects from one end surface thereof, to a point beyond the block and beyond the housing 116. The extension 145 is formed with an opening 146 therethrough midway its ends. A vertically disposed tubular shaft 147 constituting a plunger is slidably mounted in the opening 146 of the extension projecting above and below the same.

A hollow circular head member 148 open at its bottom is carried on the bottom end of the plunger and a rubber wafer-thin disk 149 closes the open bottom of the head and is secured thereto in any suitable manner. The rubber disk has a central vent. The top end of plunger 147 is formed with a tubular enlargement 150 providing a shoulder 151. A coil spring 152 encircles the plunger and is compressed between the shoulder 151 and the extension 145. The spring urges the plunger upwardly. A collar 153 is rotatably mounted on the top end of the shaft 110 and is secured thereon by a screw 154. A rigid tube 155 connected at one end to the collar 153 communicates with the interior of the tubular shaft 110 and is connected at its other end to one end of a similar rigid tube 156, secured at its other end to the enlarged portion 155 of the plunger 147, by a flexible tube 157. Air is thus piped from tubular shaft 110 to the plunger 147. A bell crank lever is pivotally mounted on a stud 158 extending laterally from one of the side surfaces of block 140, one arm 159 of the lever extending around one end wall 118 of the block and secured to the head member 148 on the bottom end of the plunger 147. The other arm 160 of the lever extends in the opposite direction toward the cover plate 17 and carries a laterally extending stud 161 on its extreme end. A finger 162 is mounted on the top end of a sleeve 163 rotatably mounted on a stud 164 upstanding on the base plate 15. The sleeve is adapted to be turned by an actuating rod 165 secured at one end to the sleeve and with its other end projecting outwardly of the side wall 20 and provided with a bent portion 166 disposed in the path of movement of a filled cup 41 at a point between the filling station and the capping station.

A camming track 167 is mounted on a pair of upstanding posts 168 on the base plate 15 under the turntable 113 positioned to one side of the path of movement of the depending finger 122 carried by the housing 116.

A camming track 169, arcuate-shaped in plan and having an upwardly slanting elongated top surface 170 at one end and a short downwardly slanting top surface 171 at its other end, is secured to the cover plate 17 adjacent the periphery of the toothed disc 113 and adjacent the housing 116, by screws passing through lugs 172 extending from the side of the camming track. The camming track is positioned close to the periphery of the turntable 113 in the path of movement of the lateral extending stud 161 on the bell crank lever arm 160 so that when the stud 161 rides up over the slanting surface 170 of the camming track, the plunger 147 with its headed member 148 is moved downwardly by the bell crank lever arm 159, and when said stud 161 rides off of the slanting surface 170 and rides down the slanting surface 171 of the camming track, the spring 152 forces the plunger 147 with its headed member 148 upwardly to normal uppermost position as shown in Fig. 8.

A horizontally disposed camming finger 173 has one end secured to the top end of a vertical post 174 fixed on the base plate 15. The other end of the finger extends close to the upper surface of the cover plate 17 in the path of movement of the stud 161 on the bell crank lever arm 160 for tilting the bell crank lever slightly.

An endless chain 175 trained around the sprocket wheels 30 and 107 and turntable 113 and through the slot 24, brings the drive from sprocket wheel 30 to the other sprocket wheel and turntable driving the same around. A spur gear 176 secured to the top end of a vertical stub shaft 177 mounted on a block 178 which is adjustably secured to the base plate 15, adjacent the inner end of the slotted portion of the cover plate 17, guides the chain around a circuitous path and tensions the same.

Three cup carriers 179 opening upwardly are carried by the chain and are spaced equidistantly therealong. The cup carriers each consist of a vertical stem 180 fastened at its lower end to a link of the chain in any suitable manner. A base or floor 181 is secured to the top of the stem and formed integrally with the periphery of said base is an arcuate-shaped upstanding wall portion 182, extending approximately 180° around the periphery of the base. The upper side ends of the wall portion 182 are extended slightly as indicated at 183 in order to proportion the dimensions of the wall extensions slightly greater than 180° so that a cup 41 may be supported on the base in balanced position yet may be slid off of the base when filled.

In operation, the motor 26 is brought into circuit with the house electrical supply by conductors 190 controlled by a switch 191 in a switch box 192, mounted on the base plate 15 near one side edge thereof. The motor through the belt 27 and pulleys 29 and 28 drives the shaft 25 which in turn drives the disc 30. Disc 30 drives the chain 175 which in turn rotates the shaft 70 and turntable 113. Chain 175 carries the cup carriers 179 around with it.

Upon rotation of shaft 25, the supporting plate 36 mounting the cup magazine 38 is swung around the cup holding assembly and rides upon the upper surface 59 of the tubular camming structure 58 and down the slanting surface 60 of said structure bringing the lowermost cup of the stack down and depositing it in a cup carrier 179. The carriers 179 are positioned along the chain and the movement of the parts are synchronized to move a cup carrier in front of the midlength of the lowermost straight track surface 61 of the tubular structure 58 simultaneously with the movement of the lever arm 49 against the camming plate 62 whereby the camming arms 42, 42 are released permitting the lowermost cup 41 in the stack of cups to fall by gravity and be deposited in the carrier 179 in front of the tubular structure 58. The carrier with the cup deposited therein is carried along the remainder of the lowermost straight surface 61 together with the rest of the stacked cups in the path of movement of a finger 193 pivotally and horizontally disposed on the top end of a post 194 fixed on the base plate 15. The finger is arranged to engage the beaded flange portion 46 of the deposited cup and hold said cup against upward movement with the rest of the stacked cups along the upwardly slanting surface 60 of the tubular structure. The deposited cup 41 is carried by the chain to the next station underneath the spout 83 of the filling mechanism 11 as shown in Fig. 9. Simultaneously with the arrival of the cup underneath the spout 83, the piston 102 is moved downwardly by contact with the camming plate 105 discharging the contents of the container 79 into the cup.

The cup or container, with the ice cream, fluid or any other viscous products therein, is carried by the chain to the next station, the capping mechanism 12, and during its travel engages the bent portion 166 of the actuating rod 165 thereby moving the pivoted finger 162 into the path of movement of the depending finger 122. During turning of the turntable 113, the housing 116 and associated parts are carried around and the depending finger 122 is tripped by member 162 causing the stud 123 to pull the sliding plate 131 in the direction of the plunger 147 against the action of spring 134 thereby carrying the lowermost cap 195 of the stack of caps in the recess 143 in the block 140 underneath the plunger 147 where it is sucked up by the air in the plunger into supported position on the bottom of the head 148 of the plunger. When the stud 161 of lever arm 160 reaches the camming track 169 it rides up over the surface 170 thereof thereby tripping the bell crank lever arm 159 which forces the head 148 with the cap 195 thereon down over the filled cup or container and thereby capping said container. The capped cup is carried around by the chain against a camming arm 196 mounted on the top of a post 197 secured to the base plate 15 and extending upwardly through an opening in the cover plate 17. Arm 196 forces the capped cup off of the carrier and onto the collecting platform 21, the shape and construction of the cup carrier 179 permitting this.

It is to be understood that any size or shape of cup may be used and these containers may be made of cardboard, plastic or any other desired material.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said chain having spaced container-supporting carriers thereon, said feeding mechanism including a bodily swingable magazine holding a supply of containers in nested stacked relation adapted to be moved over a container carrier, means for moving said magazine, means for transferring the lowermost container in the stack onto the container carrier underneath the magazine, said latter means including a vertically slidable plate, opposed pivotal arms carried by said plate gripping the lowermost container in the stack, and a cam actuated lever adapted to engage said arms and separate the same to release said lowermost container whereby said container falls by gravity into the carrier underneath the magazine.

2. A machine for packaging fluid or viscous products such as ice cream comprising, in combination, mechanism for feeding containers, mechanism for filling the containers with fluid or viscous products such as ice cream, and mechanism for capping the fluid containers, said mechanisms including sprocket wheels and an endless chain movable around said sprocket wheels for moving the same and for carrying containers to be acted upon by said various mechanisms and motor means for moving said chain, said filling mechanism including a rotatable hopper for fluid or viscous products, above the container carriers, said hopper having an outlet opening, means for rotating said hopper, a lateral arm carried by the hopper, a cup-shaped container fixed on said arm, said container having an inlet opening and an outlet opening, means for alternately opening and closing said openings, a pipe connecting the hopper outlet and the container inlet, a spout on the container communicating with the outlet opening therein, and cam actuated means for ejecting the contents of the container through the spout into a container supported on the container carrier underneath the spout.

3. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said filling mechanism including a rotatable hopper for fluid or viscous products, above the container carriers, said hopper having an outlet opening, means for rotating said hopper, a lateral arm carried by the hopper, a cup-shaped container fixed on said arm, said container having an inlet opening and an outlet opening, means for alternately opening and closing said openings, a pipe connecting the hopper outlet and the container inlet, a spout on the container communicating with the outlet opening therein, and cam actuated means for ejecting the contents of the container through the spout into a container supported on the container carrier underneath the spout, said means for alternately opening and closing the inlet and outlet openings in the container including a disk rotatably mounted in the bottom of the container, said disk having an opening adapted to register with either the inlet opening or outlet opening, and means for rotating said disk.

4. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said filling mechanism including a rotatable hopper for fluid or viscous products, above the container carriers, said hopper having an outlet opening, means for rotating said hopper, a lateral arm carried by the hopper, a cup-shaped container fixed on said arm, said container having an inlet opening and an outlet opening, means for alternately opening and closing said openings, a pipe connecting the hopper outlet and the container inlet, a spout on the container communicating with the outlet opening therein, cam actuated means for ejecting the contents of the container through the spout into a container supported on the container carrier underneath the spout, said means for alternately opening and closing the inlet and outlet openings in the container including a rotatable shaft extending through the bottom of the container, a disk secured to the inner end of the shaft and seated on the bottom of the container over said openings, said disk having an opening adjacent its periphery adapted to register with either the inlet opening or the outlet opening, a gear on the outer end of said shaft, and a train of gearing interposed between said gear and the means for driving the chain.

5. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said filling mechanism including a rotatable hopper for fluid or viscous products, above the container carriers, said hopper having an outlet opening, means for rotating said hopper, a lateral arm carried by the hopper, a cup-shaped container fixed on said arm, said container having an inlet opening and an outlet opening, means for alternately opening and closing said openings, a pipe connecting the hopper outlet and the container inlet, a spout on the container communicating with the outlet opening therein, cam actuated means for ejecting the contents of the container through the spout into a container supported on the container carrier underneath the spout, said ejecting means including a piston movable in said container, spring means for normally holding said piston above the contents of the container, and a camming plate disposed in the path of movement of said container and adapted to engage said piston during said movement and press said piston downwardly in the container forcing the contents thereof out through the spout.

6. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chains, said filling mechanism including a rotatable hopper for fluid or viscous products, above the container carriers, said hopper having an outlet opening, means for rotating said hopper, a lateral arm carried by the hopper, a cup-shaped container fixed on said arm, said container having an inlet opening and an outlet opening, means for alternately opening and closing said openings, a pipe connecting the hopper outlet and the container inlet, a spout on the container communicating with the outlet opening therein, cam actuated means for ejecting the contents of the container through the spout into a container supported on the container carrier underneath the spout, said means for alternately opening and closing the inlet and outlet openings in the container including a rotatable shaft extending through the bottom of the container, a disk secured to the inner end of the shaft and seated on the bottom of the container over said openings, said disk having an opening adjacent its periphery adapted to register with either the inlet opening or the outlet opening, a gear on the outer end of said shaft, a train of gearing interposed between said gear and the means for driving the chain, said ejecting means including a piston movable in said container, spring means for normally holding said piston above the contents of the container, and a camming plate disposed in the path of movement of said container and adapted to engage said piston during said movement and press said piston downwardly in the container forcing the contents thereof out through the spout.

7. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said chain having spaced container-supporting carriers thereon, said mechanism for capping the filled containers including a turntable, a housing carried by said turntable, a block mounted on said housing, said block having a recess for housing a stack of caps for the filled containers, a plate slidably mounted on the housing and underneath the block and movable in the path of the lowermost cap in the stack for removing said lowermost cap and carrying same in supported condition, a plunger on the block having suction means for lifting said cap off of the sliding plate, and means for moving said plunger with the cap downwardly over a filled container for depositing the cap onto the container.

8. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said chain having spaced container-supporting carriers thereon, said feeding mechanism including a bodily swingable magazine holding a supply of containers in nested stacked relation adapted to be moved over a container carrier, means for moving said magazine, and means for transferring the lowermost container in the stack onto the container carrier underneath the magazine, said mechanism for capping the filled containers including a turntable, a housing carried by said turntable, a block mounted on said housing, said block having a recess for housing a stack of caps for the filled containers, a plate slidably mounted on the housing and underneath the block and movable in the path of the lowermost cap in the stack for removing said lowermost cap and carrying same in supported condition, a plunger on the block having suction means for lifting said cap off of the sliding plate, and means for moving said plunger with the cap downwardly over a filled container for depositing the cap onto the container.

9. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said chain having spaced container-supporting carriers thereon, said feeding mechanism including a bodily swingable magazine holding a supply of containers in nested stacked relation adapted to be moved over a container carrier, means for moving said magazine, means for transferring the lowermost container in the stack onto the container carrier underneath the magazine, said latter means including a vertically slidable plate, opposed pivotal arms carried by said plate gripping the lowermost container in the stack, and a cam actuated lever adapted to engage said arms and separate the same to release said lowermost container whereby said container falls by gravity into the carrier underneath the magazine, said mechanism for capping the filled containers including a turntable, a housing carried by said turntable, a block mounted on said housing, said block having a recess for housing a stack of caps for the filled containers, a plate slidably mounted on the housing and underneath the block and movable in the path of the lowermost cap in the stack for removing said lowermost cap and carrying same in supported condition, a plunger on the block having suction means for lifting said cap off of the sliding plate, and means for moving said plunger with the cap downwardly over a filled container for depositing the cap onto the container.

10. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said filling mechanism including a rotatable hopper for fluid or viscous products, above the container carriers, said hopper having an outlet opening, means for rotating said hopper, a lateral arm carried by the hopper, a cup-shaped container fixed on said arm, said container having an inlet opening and an outlet opening, means for alternately opening and closing said openings, a pipe connecting the hopper outlet and the container inlet, a spout on the container communicating with the outlet opening therein, cam actuated means for ejecting the contents of the container through the spout into a container supported on the container carrier underneath the spout, said chain having spaced container-supporting carriers thereon, said mechanism for capping the filled containers including a turntable, a housing carried by said turntable, a block mounted on said housing, said block having a recess for housing a stack of caps for the filled containers, a plate slidably mounted on the housing and underneath the block and movable in the path of the lowermost cap in the stack for removing said lowermost cap and carrying same in supported condition, a plunger on the block having suction means for lifting said cap off of the sliding plate, and means for moving said plunger with the cap downwardly over a filled container for depositing the cap onto the container.

11. A machine for packaging fluid or viscous products such as ice cream comprising, in combination, mechanism for feeding containers, mechanism for filling the containers with fluid or viscous products such as ice cream, and mechanism for capping the filled containers, said mechanisms including sprocket wheels and an endless chain movable around said sprocket wheels for moving the same and for carrying containers to be acted upon by said various mechanisms and motor means for moving said chain, said filling mechanism including a rotatable hopper for fluid or viscous products, above the container carriers, said hopper having an outlet opening, means for rotating said hopper, a lateral arm carried by the hopper, a cup-shaped container fixed on said arm, said container having an inlet opening and an outlet opening, means for alternately opening and closing said openings, a pipe connecting the hopper outlet and the container inlet, a spout on the container communicating with the outlet opening therein, cam actuated means for ejecting the contents of the container through the spout into a container supported on the container carrier underneath the spout, said means for alternately opening and closing the inlet and outlet openings in the container including a disk rotatably mounted in the bottom of the container, said disk having an opening adapted to register with either the inlet opening or outlet opening, means for rotating said disk, said chain having spaced container-supporting carriers thereon, said mechanism for capping the filled containers including a turntable, a housing carried by said turntable, a block mounted on said housing, said block having a recess for housing a stack of caps for the filled containers, a plate slidably mounted on the housing and underneath the block and movable in the path of the lowermost cap in the stack for removing said lowermost cap and carrying same in supported condition, a plunger on the block having suction means for lifting said cap off of the sliding plate, and means for moving said plunger with the cap downwardly over a filled container for depositing the cap onto the container.

12. In a machine for packaging fluid or viscous products, mechanism for feeding cups to be filled including an endless chain, carriers for containers secured to said chain, a driven shaft, means for driving the chain, a sprocket wheel secured to said shaft and engaging said chain, a magazine for holding cups in stacked relation supported on said shaft, a frame secured to and surrounding said shaft, said frame including a vertically slidable plate, a horizontal plate secured at one end to said slidable plate, said horizontal plate having a circular opening at its free end, pivotal gripping arms mounted on said horizontal plate for gripping the lowermost cup in the supported stack, a circular camming track around said shaft, a bracket depending from said horizontal plate, a roller supported at the lower end of said bracket and movable over the camming track, a bell crank lever carried by the bracket, and a camming plate in the path of movement of one arm of said bell crank lever for tripping the same, the other arm of said bell crank lever moving between and into engagement with the gripping arms for separating said arms.

13. A machine for packaging fluid or viscous products such as ice cream comprising a frame having a base plate and a cover plate spaced therefrom, mechanisms supported in part on said cover plates for feeding cups, for filling the cups with fluid or viscous products such as ice cream and for capping the filled cups, said mechanisms including sprocket wheels and an endless chain movable around said sprocket wheels for moving the same and for carrying cups to be acted upon by said various mechanisms and motor means for moving said chain, said chain having spaced cup-supporting carriers thereon, said feeding mechanism including a rotatable shaft, a sprocket wheel secured to said shaft, and engageable with said chain, a tubular structure supported on the cover plate around the shaft, said tubular structure having camming surfaces formed thereon, a frame carried around by said shaft, said frame including a vertically slidable plate, a horizontally disposed plate secured to said slidable plate, said plate having a substantially circular opening at its free end, opposed pivotal arms carried by said horizontal plate, a magazine for supporting stacked cups on the outer free end of said horizontal plate, above said circular opening, opposed pivotal arms carried by said horizontal plate adapted to grip the lowermost cup in the stack, a bell crank lever carried by the horizontal plate for separating said arms whereby said gripped lowermost cup is adapted to fall by gravity onto a cup-supporting carrier, and a cam plate on the cover plate inside said tubular structure in the path of movement of the bell crank lever for tripping said bell crank lever for separating the arms.

References Cited in the file of this patent
UNITED STATES PATENTS

| | | |
|---|---|---|
| 1,582,451 | Cooley | Apr. 27, 1926 |
| 2,699,281 | Duke | Jan. 11, 1955 |